Jan. 15, 1952     G. H. REID     2,582,796
ATTITUDE-INDICATING INSTRUMENT FOR AIR AND OTHER CRAFT
Filed Jan. 20, 1950
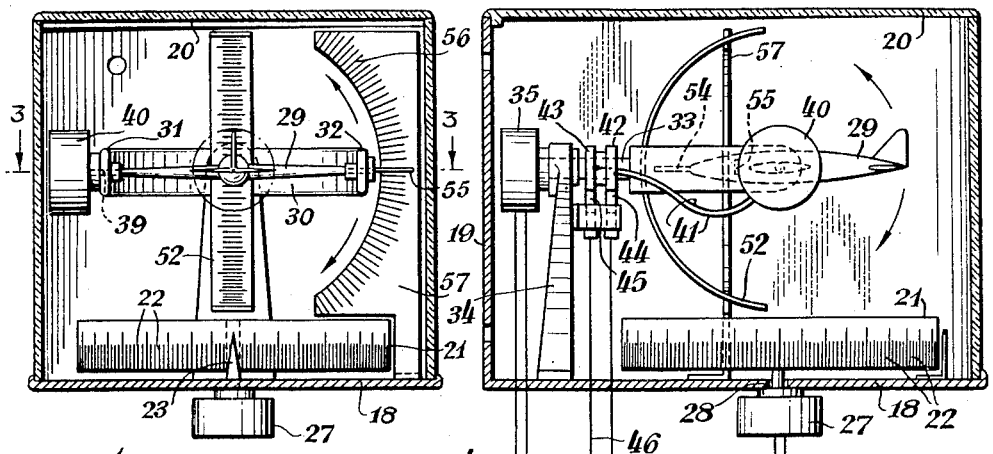
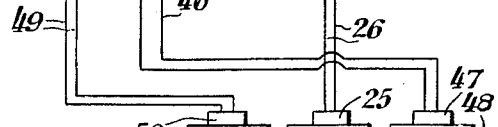
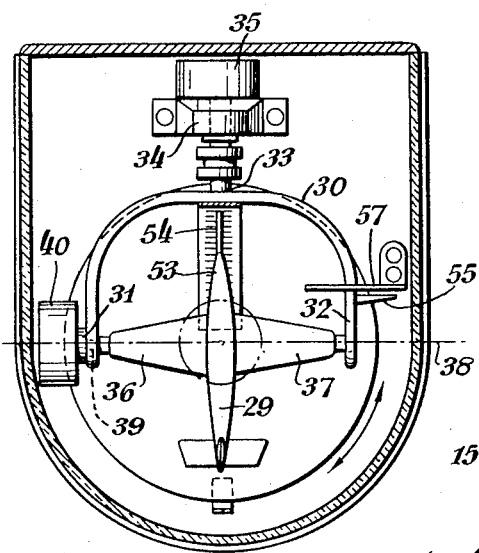
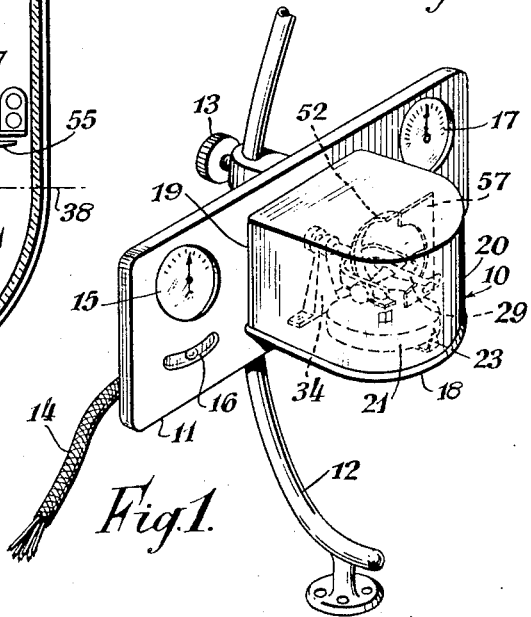
INVENTOR
George Hancock Reid
BY
Stevens, Davis, Miller & Mosher
ATTORNEYS Patented Jan. 15, 1952

2,582,796

UNITED STATES PATENT OFFICE 2,582,796

ATTITUDE-INDICATING INSTRUMENT FOR AIR AND OTHER CRAFT

George Hancock Reid, Braunstone, near Leicester, England

Application January 20, 1950, Serial No. 139,747
In Great Britain November 22, 1948

5 Claims. (Cl. 177—311)

This invention relates to attitude-indicating instruments for air and other craft.

It is the object of the invention to provide an improved form of attitude-indicating instrument which is very compact and which shows the attitude of the craft in a manner which is very readily interpreted by the pilot or navigator, the instrument being especially suitable for use when flying in cloud or under other "blind" conditions.

Instruments have hitherto been proposed, incorporating an indicator member in the form of a miniature aircraft or the like which is universally mounted and is caused to move angularly (relative to the instrument casing) in the same manner as the craft moves angularly relative to the level; although such instruments are normally effective for use in normal flying (as distinct from aerobatics) the permitted angular movement of the indicator member is restricted so that if the craft makes a complete roll, or loops the loop, the instrument is rendered inoperative, at least temporarily. The invention sets out to avoid this difficulty by mounting and driving the indicator member so that it can move angularly to any extent about the roll and pitch axes.

A further object of the invention is to provide an improved form of instrument which is able to remain reliably operative throughout manoeuvres of any angular value about any of the three axes.

A further object of the invention is to provide a system which enables the indicating instrument itself to be very compact, with practically no working parts tending to obscure the pilot's view of the model aircraft.

According to the invention an attitude indicating instrument for a craft comprises an indicator member which is mounted relative to the instrument casing for movement about its pitch and roll axes, and an electric synchronous remote control motor which moves it about one of these axes and is arranged to be electrically actuated from a remote transmitter unit susceptible to motion of the craft about that axis.

There is further provided according to the invention an attitude-indicating instrument for a craft comprising an indicator member representing a craft in miniature, mounted relative to the instrument casing for movement about its pitch and roll axes, and two electric synchronous remote control motors which move the indicator member respectively about said two axes, the motors being arranged to be electrically actuated from remote transmitter means susceptible to motion of the craft itself about the said two axes.

Preferably a landscape member is rotatable about a normally vertical axis, and is driven by an electrical synchronous remote control motor to indicate the apparent turning of the landscape (as seen from the craft) when the craft turns about the yaw axis. The indicator member may be pivotally mounted about its pitch axis to a gimbal frame, said gimbal frame carrying a synchronous electric motor which turns the indicator about the pitch axis and is connected electrically to the transmitter means by a rotary contact device permitting unlimited angular movement of the gimbal frame in both directions relative to the instrument casing. Thus the gimbal frame may be U-shaped and may be pivotally mounted about its axis of symmetry which is normally horizontal, the indicator member being disposed between the limbs and being pivotally mounted about an axis disposed at right angles to the said axis of symmetry.

There is further provided according to another aspect of the invention an attitude indicating instrument for an aircraft comprising in combination a casing, a U-shaped gimbal frame pivotally mounted within the casing for unrestricted rotational movement about a normally horizontal axis of symmetry, a first selsyn motor arranged to move the gimbal frame about said axis, an indicator member mounted pivotally between the arms of the gimbal frame to move relatively thereto about a transverse axis at right angles to the axis of symmetry, a second selsyn motor mounted upon the gimbal frame to turn the indicator member about the said transverse axis, a landscape member mounted within the casing for rotational movement about a normally vertical axis disposed at right angles to the said axis of symmetry, and a third selsyn motor arranged to turn the landscape member about said vertical axis. Preferably the indicator member comprises a miniature aircraft having its wing tips pivotally connected to the arms of the U-shaped gimbal frame, the second selsyn motor being carried upon one of said arms. An arcuate scale showing the pitch may be carried by the gimbal frame, said pitch scale extending in the plane which contains the axis of symmetry and is at right angles to the said transverse axis. Also an angular scale showing bank is mounted within the casing so as to indicate the inclination of the said transverse axis relative to the casing. The casing may advantageously be mounted upon a supporting device enabling it to be raised and lowered and to be angularly adjusted. This supporting device can comprise an arcuately curved guide along which the casing is slidable, means being provided for clamping the casing at any desired position along the guide.

The invention is illustrated by way of example in the accompanying diagrammatic drawings, in which:

Figure 1 is a perspective view of an instrument panel incorporating the improved attitude-indicating instrument;

Figure 2 is a front elevation of the attitude-indicating instrument, the casing of which is shown in section;

Figure 3 is a plan taken partly in section on the line 3—3 of Figure 2; and

Figure 4 is a side elevation, the instrument casing again being shown in section.

The device shown in Figure 1 has been devised more especially to provide an extremely compact assembly of instruments which can be adjusted bodily to suit the user and is particularly applicable for aircraft, submarines and other craft where the pilot is required to work in a prone position. The attitude-indicating instrument is shown at 10 and is attached to a panel 11 which is mounted upon a curved rail 12 so as to be slidable therealong, means such as a set-screw 13 being provided for locking the adjustment. The rail 12 is fitted in the aircraft in a vertical plane and the pilot can raise or lower the panel along an arcuate path to a position which best suits him. As the improved instrument is operated wholly electrically, only electrical connections need be made to the panel, a multi-core flexible conductor for this purpose being indicated at 14. The panel 11 conveniently includes other instruments besides that shown at 10; thus a rate-of-turn indicator 15, a "bubble bank" indicator 16 and an air-speed indicator 17 are included in Figure 1, but these per se form no part of the present invention.

The attitude-indicating instrument 10 has a casing which is conveniently composed of a metal base 18 and back 19, with a cover 20 the top, front and sides of which latter are composed of transparent sheet material so as to enable the working parts of the instrument to be well illuminated and clearly visible from the front and above, over a wide range of view-points.

Above the base 18 is a wheel-like indicating member 21, herein termed the landscape member as it is controlled so as to act as a direction indicator, said member maintaining as far as possible a constant angular disposition relative to the landscape below the aircraft. For the pilot looking at the instrument the upper surface of the landscape member 21 represents the ground. The peripheral surface of the landscape member has an angular-scale as indicated at 22 so that the direction in which the aircraft is heading during normal flight can be read off from an index pointer 23 fixed to the base 18. The landscape member 21 is constantly orientated by a Selsyn or like electrical remote control system operated by a directional gyro, master compass or like unit indicated at 24. This operates the transmitter 25 of the Selsyn or like system, which transmitter is connected by flexible electric conductors 26 with the Selsyn or equivalent motor 27 rotatably connected, as by spindle 28, with the landscape member 21. The compass unit 24 and the electric Selsyn system 25—27 are both well known in the art and need no further description; for this reason they are shown purely diagrammatically in Figure 4.

It is now convenient to mention that the plane of the landscape member 21 is taken as the datum in defining the positions of the various axes of the instrument, and said plane is regarded as "normally" horizontal, despite the fact that (even if horizontal when the aircraft is level) it moves to an inclined position when the aircraft climbs, dives or banks; also if the instrument 10 is moved to the lower part of the rail 12, the instrument as a whole is inclined (including the plane of the landscape member 21), but the pilot when looking at it can still easily regard the landscape member as a horizontal datum plane representing the earth's surface, irrespective of its actual attitude in space. Thus when the term "normally" is used in this specification, it is assumed that the instrument is positioned so that the landscape member is in a horizontal plane.

The requisite attitude indication is given by an indicator member in the form of a miniature aircraft 29 which is universally supported above the landscape member 21 by means of a U-shaped gimbal frame 30 having arms 31, 32 and a spindle 33 which extends from the "base" of the U coincident with the axis of symmetry of the gimbal frame. The spindle 33 is rotatably supported in a bearing 34 and is arranged to be turned by a Selsyn motor 35. The miniature aircraft 29 is disposed between the arms 31, 32 to which its wing tips 36, 37 are pivotally connected, so as to allow rotation of the aircraft 29 about a transverse axis indicated at 38 in Figure 3. This axis 38 is disposed at right angles to the axis of the spindle 33, which latter extends in the fore-and-aft direction and is normally horizontal, i. e. is parallel with the general plane of the landscape member 21.

The wing tip 36 is pivotally mounted on the arm 31 by a spindle 39, the outer end of which is rotated by a Selsyn motor 40 mounted upon the outside of the arm 31 so as to move bodily with the gimbal frame 30; the electrical connection to the Selsyn motor 40 is effected by taking its conductor leads 41 (Figure 4) to two slip rings 42, 43 on the spindle 33, a corresponding pair of brushes 44, 45 being mounted upon the bearing 35. Wires 46 from these brushes lead to a Selsyn transmitter 47 which is driven by a pitch reference unit 48, such as an artificial horizon gyroscope. The Selsyn motor 35 is connected by wires 49 with a Selsyn transmitter 50 operated by a pitch reference device 51, such as an artificial horizon gyroscope. It will thus be seen that as the aircraft in which the instrument is mounted moves angularly in pitch and/or roll, corresponding electrical signals are produced by the transmitters 50 and 47 and cause the Selsyn motors 35 and 40 to move the miniature aircraft 29 correspondingly so that it appears to dive, climb and roll relative to the landscape member 21, in the same sense as the aircraft moves relative to the earth's surface. When the aircraft yaws, the earth's surface appears to the pilot to turn, and this is simulated by rotation of the landscape member due to the signals received by the Selsyn motor 27. The scale 22 around the landscape member shows the bearing of the aircraft and thus serves as a directional indicator. In order to measure the angle of climb or dive during ordinary flight an arcuate scale 52 is mounted upon the gimbal frame 30, and the nose 53 of the aircraft 29 is provided with a pointer 54 which moves along the scale 52. Also the arm 32 of the gimbal frame 30 is provided with a pointer 55 which swings across a scale 56 as the aircraft banks, the scale 56 being formed upon a plate 57 attached to the base 18 of the casing.

By the use of selsyn or like electric synchronous motors it is readily possible to arrange for the landscape member 21 and the miniature aircraft 29 to have freedom to make an unlimited number of revolutions in both directions, so that by using suitably stabilised units 24, 48 and 51, the indicating member 29 and landscape member 21 provide a continuous representation of the aircraft's attitude in space, even while (and after) making loops and rolls. Adjusting means (not shown) are of course provided in the selsyn or like systems in order to adjust initially the angular position of the indicator member 29 and the landscape member 21.

Any convenient means may be provided for illuminating the instrument, either natural daylight or artificial illumination. If desired the miniature aircraft or equivalent indicating member and its scales, also the landscape member, may be made fluorescent and be caused to glow by illuminating them with suitable ultra-violet or infra-red light.

What I claim is:

1. An attitude-indicating instrument for an aircraft comprising in combination a casing, a U-shaped gimbal frame pivotally mounted within the casing for unrestricted rotational movement about a normally horizontal axis of symmetry, a first selsyn motor arranged to move the gimbal frame about said axis, an indicator member disposed between the arms of the gimbal frame and pivoted to said arms for movement relatively thereto about a transverse axis at right angles to the axis of symmetry, a second selsyn motor mounted upon the gimbal frame to turn the indicator member about the said transverse axis, a landscape member mounted within the casing underneath the indicator for rotational movement about a normally vertical axis disposed at right angles to the said axis of symmetry, and a third selsyn motor arranged to turn the landscape member about said vertical axis.

2. An attitude - indicating instrument as claimed in claim 1, wherein the indicator member comprises a miniature aircraft having its wing tips pivotally connected to the arms of the U-shaped gimbal frame, the second selsyn motor being carried upon one of said arms.

3. An attitude - indicating instrument as claimed in claim 1, wherein an arcuate scale showing pitch is carried by the gimbal frame, said pitch scale extending in the plane which contains the axis of symmetry and is at right angles to the said transverse axis.

4. An attitude - indicating instrument as claimed in claim 1, wherein an angular scale showing bank is mounted within the casing and indicates the inclination of the said transverse axis relative to the casing.

5. An attitude-indicating instrument for an aircraft comprising in combination a casing, a U-shaped gimbal frame pivotally mounted within the casing for unrestricted rotational movement about a normally horizontal axis of symmetry, a first selsyn motor arranged to move the gimbal frame about said axis, an indicator member disposed between the arms of the gimbal frame and pivoted to said arms for movement relatively thereto about a transverse axis at right angles to the axis of symmetry, said indicator member being free to make unrestricted rotation between the arms of the U-shaped gimbal frame, and a second selsyn motor mounted upon the gimbal frame to turn the indicator member about the said transverse axis.

GEORGE HANCOCK REID.

REFERENCES CITED

The following references are of record in the file of this patent:

UNITED STATES PATENTS

| Number | Name | Date |
|---|---|---|
| 2,080,490 | Kollsman | May 18, 1937 |
| 2,283,190 | Crane | May 19, 1942 |
| 2,424,570 | Jenks | July 29, 1947 |